(12) United States Patent
Fujimoto

(10) Patent No.: US 6,304,282 B1
(45) Date of Patent: Oct. 16, 2001

(54) COLOR IMAGE FORMING APPARATUS

(75) Inventor: Makoto Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/466,905

(22) Filed: Dec. 20, 1999

(30) Foreign Application Priority Data

Dec. 22, 1998 (JP) .................................................. 10-376347

(51) Int. Cl.⁷ .................................................. B41J 15/14
(52) U.S. Cl. .......................... 347/242; 347/244; 347/257; 347/258
(58) Field of Search ..................................... 347/241, 242, 347/243, 244, 245, 256, 257, 259, 263, 204, 206, 662, 710, 808, 819, 258

(56) References Cited

FOREIGN PATENT DOCUMENTS

| 2-20986 | 1/1990 | (JP) . |
|---|---|---|
| 3-264970 | 11/1991 | (JP) . |
| 9-179054 | 7/1997 | (JP) . |

*Primary Examiner*—N. Le
*Assistant Examiner*—Hai C. Pham

(57) ABSTRACT

Disclosed is a color image forming apparatus in which it is possible to prevent positional deviation in scanning of each optical scanning device without having to improve the lens accuracy to an extreme degree. In a color image forming apparatus of the type which has a plurality of sets of optical scanning devices and image carriers, each of the plurality of optical scanning devices includes a laser unit having a semiconductor laser and a collimator lens, a cylindrical lens formed of a plastic lens material and adapted to effect image formation on the deflection surface of a light deflector from a beam emitted from the laser unit, and an fθ lens system having at least one plastic lens for effecting image formation on the surface of the image carrier from the beam deflected by the light deflector, wherein at least one of the plastic lenses of each of the plurality of optical scanning devices is molded in the same cavity, and wherein at least one of the plastic lenses molded in the same cavity is molded in a multiple cavity mold.

40 Claims, 11 Drawing Sheets

HOLDING MEMBER 22

CYLINDER 8

PLASTIC LENS 10

PLASTIC LENS 11

COLOR IMAGE FORMING APPARATUS

BACKGROUND OF THE INVENTION

1. Field of the Invention

The present invention relates to a color image forming apparatus and, in particular, to a color image forming apparatus which has a plurality of pairs of optical scanning devices and corresponding image carriers, optical scanning being performed on each image carrier with a beam emitted from each optical scanning device to thereby form an image, or a color image forming apparatus which has an optical scanning device including a multi-semiconductor laser and a plurality of image carriers, optical scanning being performed on the image carriers with a plurality of beams emitted from the optical scanning device to thereby form an image. The image forming apparatus is suitably applicable, for example, to a high speed laser printer apparatus, a plural-drum type color copying machine or a digital color copying machine.

2. Description of the Related Art

Conventionally, in a color image forming apparatus such as a plural-drum type color printer or a plural-drum type color copying machine, a laser exposure device, that is, an optical scanning device has been used which provides a plurality of image forming sections corresponding to color components obtained through color separation with image data corresponding to the color components, that is, a plurality of beams.

Generally speaking, an optical scanning device comprises a semiconductor laser device serving as the light source, a first lens unit (collimator lens, cylindrical lens, etc.) for reducing the diameter of a beam emitted from the semiconductor laser device to a predetermined dimension, a light deflector for continuously deflecting and reflecting the beam whose diameter has been reduced by the first lens unit in a direction perpendicular to the direction in which the recording medium is conveyed, a second lens unit (fθ lens system) for forming an image at a predetermined position of the recording medium from the beam deflected and reflected by the light deflector, etc.

In known examples of such an optical scanning device, a plurality of optical scanning devices are arranged in correspondence with the image forming sections, or a multi-beam optical scanning device capable of providing a plurality of beams is arranged.

In an example of the multi-beam optical scanning device, lens units such as fθ lenses are arranged in a number corresponding to the number of beams, as disclosed in Japanese Patent Laid-Open No. 3-264970. Further, as disclosed in Japanese Patent Publication No. 2-20986, there is arranged in the vicinity of the photosensitive member (photosensitive drum) a cylindrical lens for causing a plurality of beams to impinge upon a single light deflector and to be condensed by a single fθ lens (scanning lens) to correct any bend of the scanning line.

However, the above conventional multi-beam optical scanning devices have the following problems.

In the device disclosed in Japanese Patent Publication No. 2-20986, the beam impinges upon the fθ lens obliquely, so that the scanning line is curved, and the curved scanning line is corrected by a cylindrical lens. However, the correction cannot be effected completely. When there are a plurality of incident beams, there exist a plurality of incident angles, and the scanning lines with different curvatures cause positional deviation on the surface of the photosensitive member.

In the device disclosed in Japanese Patent Laid-Open No. 3-264970, the number of lens units such as fθ lens are arranged to correspond to the number of beams. In the case of this arrangement, the plurality of beams pass the centers of the respective optical systems, so that the scanning line is not easily curved. However, unless the accuracy of the optical systems is improved to an extreme degree, positional deviation in the scanning direction is generated on the surface of the photosensitive member due to errors in production. To avoid this, the lens accuracy is improved to an extreme degree, or a lens position adjusting mechanism is provided, resulting in the apparatus as a whole being complicated. Further, this leads to an increase in production cost.

SUMMARY OF THE INVENTION

It is a first object of the present invention to provide a color image forming apparatus of the type which has a plurality of pairs of optical scanning devices and image carriers, wherein each optical scanning device is appropriately constructed, whereby it is possible to prevent scanning positional deviation of each optical scanning device without having to improve the lens accuracy to an extreme degree.

It is a second object of the present invention to provide a color image forming apparatus of the type which has an optical scanning device including a multi-semiconductor laser and a plurality of image carriers, wherein the optical scanning device is appropriately constructed, whereby it is possible to prevent scanning positional deviation without having to improve the lens accuracy to an extreme degree.

In accordance with the present invention, there is provided a color image forming apparatus of the type which has a plurality of sets of optical scanning devices and image carriers, in which beams emitted from the optical scanning devices are directed to the surfaces of the corresponding image carriers, scanning being performed on the surfaces of the image carriers with the beams to form images of different colors on the surfaces of the image carriers, a color image being formed from the images formed on the surfaces of the plurality of image carriers, wherein each of the plurality of optical scanning devices comprises
a laser unit having a semiconductor laser and a collimator lens,
a cylindrical lens consisting of a plastic lens material and adapted to form an image on the deflection surface of a light deflector from a beam emitted from the laser unit, and
an fθ lens system having at least one plastic lens for forming an image on the surface of the image carrier from the beam deflected by the light deflector,
wherein at least one of the plastic lenses of the plurality of optical scanning devices is molded by a multiple cavity mold.

In particular, in each of the plurality of optical scanning devices, the laser unit, the cylindrical lens, and the fθ lens system are held by a single plastic holding member, and the plastic holding member is molded by a multiple cavity mold.

In each of the plurality of optical scanning devices, the light deflector is also held by the plastic holding member.

The cavity combination of the plastic lens and the plastic holding member is specified, and, with another combination, the plastic lens is not attached to the plastic holding member.

The cavity combination of the plastic lens and the plastic holding member is constructed such that it can be recognized from the outside of each optical scanning device.

A plurality of optical scanning devices of the same cavity combination of the plastic lens and the plastic holding member are mounted in the apparatus main body.

The fθ lens system has two plastic lenses, and the cavity combination of the two plastic lenses is specified, no attachment being possible with any other combination.

The cavity combination of the two plastic lenses constituting the fθ lens system is constructed such that it can be recognized from the outside of each optical scanning device.

Optical scanning devices of the same cavity combination of the two plastic lenses constituting the fθ lens system are mounted in the apparatus main body.

The plurality of optical scanning devices share a light deflector.

Further, in accordance with the present invention, there is provided a color image forming apparatus of the type which has a plurality of sets of optical scanning devices and corresponding image carriers, and in which beams emitted from the optical scanning devices are directed to the surfaces of the corresponding image carriers, scanning being performed on the surfaces of the image carriers with the beams to form images of different colors on the surfaces of the image carriers, a color image being formed from the images formed on the surfaces of the plurality of image carriers, wherein each of the plurality of optical scanning devices has at least one plastic lens and a plastic holding member for holding at least one optical element, and at least one of the plastic lens and the plastic holding member is molded by the same cavity of the multiple cavity mold, and the cavity combination of the plastic lens and the plastic holding member is specified, the plastic lens not being attachable to the plastic holding member with any other cavity combination.

In particular, the cavity combination of the plastic lens and the plastic holding member can be recognized from the outside of each optical scanning device.

A plurality of optical scanning devices of the same cavity combination of the plastic lens and the plastic holding member are mounted in the apparatus main body.

Each of the plurality optical scanning devices has a light deflector, which is held by the plastic holding member.

The plurality of optical scanning devices share a light deflector.

Further, in accordance with the present invention, there is provided a color image forming apparatus of the type which has a plurality of optical scanning devices including a multi-semiconductor laser and a plurality of image carriers, and in which a plurality of beams emitted from the optical scanning devices are directed to the surfaces of the corresponding image carriers, scanning being performed on the surfaces of the image carriers with the beams to form images of different colors on the surfaces of the image carriers, a color image being formed from the images formed on the surfaces of the plurality of image carriers, wherein the plurality of optical scanning devices comprise
a laser unit having the multi-semiconductor laser and a collimator lens,
a cylindrical lens consisting of a plastic lens material and adapted to form images on the deflecting surface of the light deflector from a plurality of beams emitted from the laser unit, and
an fθ lens system having at least one plastic lens for forming images on the surfaces of the image carriers from the plurality of beams deflected by the light deflector, and
wherein at least one of the plastic lenses of the optical scanning device is molded in the same cavity of a multiple cavity mold.

In particular, in the plurality of optical scanning devices, the laser unit, the cylindrical lens, and the fθ lens system are held by a single plastic holding member, and the plastic holding member is molded in the same cavity of a multiple cavity mold.

In the plurality of optical scanning devices, the light deflector is also held by the plastic holding member.

The cavity combination of the plastic lens and the plastic holding member is specified, and the plastic lens does not attach to the plastic holding member with any other combination.

The cavity combination of the plastic lens and the plastic holding member can be recognized from the outside of the optical scanning device.

In the plurality of optical scanning devices, the cavity combination of the plastic lens and the plastic holding member is the same.

The fθ lens system has two plastic lenses, and the cavity combination of the two plastic lenses is specified, the attachment being impossible with any other combination.

The cavity combination of the two plastic lenses constituting the fθ lens system can be recognized from the outside of the optical scanning device.

In the plurality of optical scanning devices, the cavity combination of the two plastic lenses constituting the fθ lens system is the same.

Further, in accordance with the present invention, there is provided a color image forming apparatus of the type which has a plurality of optical scanning devices including a multi-semiconductor laser and a plurality of image carriers, and in which a plurality of beams emitted from the optical scanning devices are directed to the surfaces of the corresponding image carriers, scanning being performed on the surfaces of the image carriers with the beams to form images of different colors on the surfaces of the image carriers, a color image being formed from the images formed on the surfaces of the plurality of image carriers, wherein the plurality of optical scanning devices have at least one plastic lens and a plastic holding member holding at least one optical element, wherein at least one of the plastic lens and the plastic holding member is molded in the same cavity of a multiple cavity mold, and wherein the cavity combination of the plastic lens and the plastic holding member is specified, and the plastic lens cannot be attached to the plastic holding member with any other combination.

In particular, the cavity combination of the plastic lens and the plastic holding member can be recognized from the outside of the optical scanning device.

In the plurality of optical scanning devices, the cavity combination of the plastic lens and the plastic holding member is the same.

The plurality of optical scanning devices have a light deflector, which is held by the plastic holding member.

Further, in accordance with the present invention, there is provided a color image forming apparatus of the type which has a plurality of sets of optical scanning devices and image carriers, and in which beams emitted from the optical scanning devices are directed to the surfaces of the corresponding image carriers, scanning being performed on the surfaces of the image carriers to form images of different colors on the surfaces of the image carriers, a color image being formed from the images formed on the plurality of image carriers, wherein each of the plurality of optical scanning devices comprises
a laser unit, a light deflector for deflecting the beam emitted from the laser unit, and a lens system having at least one plastic lens for forming an image on a predetermined surface from the beam emitted from the laser unit, and wherein at least one of the plastic lenses of the plurality of optical scanning devices is molded in the same cavity of a multiple cavity mold.

In particular, in each of the plurality of optical scanning devices, the laser unit and the lens system are held by a single plastic holding member, and the plastic holding member is molded in the same cavity of a multiple cavity mold.

In each of the plurality of optical scanning devices, the light deflector is also held by the plastic holding member.

The laser unit has a multi-semiconductor laser emitting a plurality of beams.

Further, in accordance with the present invention, there is provided a color image forming apparatus of the type which has an optical scanning device including a light source portion emitting a plurality of beams and a plurality of image carriers, and in which a plurality of beams emitted from the optical scanning device are directed to the surfaces of the corresponding image carriers, scanning being performed on the surfaces of the image carriers with the beams to form images of different colors on the surfaces of the image carriers, a color image being formed from the images formed on the surfaces of the plurality of image carriers, wherein the optical scanning device comprises a light source portion, a light deflector for deflecting a plurality of beams emitted from the light source portion, and a lens system having at least one plastic lens for effecting image formation on a predetermined surface with the plurality of beams emitted from the light source portion, wherein there are provided a plurality of said lens systems in correspondence with the plurality of beams, and wherein at least one of the plastic lenses of the lens systems is molded in the same cavity of a multiple cavity mold.

Further, in accordance with the present invention, there is provided a color image forming apparatus of the type which has an optical scanning device including a multi-semiconductor laser and a plurality of image carriers, and in which a plurality of beams emitted from the optical scanning device are led to the surfaces of corresponding image carriers, scanning being performed on the surfaces of the image carriers with the beams to form images of different colors on the surfaces of the image carriers, a color image being formed from the images formed on the surfaces of the plurality of image carriers, wherein the optical scanning device comprises a laser unit having a multi-semiconductor laser and a collimator lens, a light deflector for deflecting a plurality of beams emitted from the laser unit, a cylindrical lens consisting of a plastic lens material and adapted to effect image formation on the deflection surface of the light deflector from the plurality of beams emitted from the laser unit, and and an fθ lens system having at least one plastic lens for effecting image formation on a predetermined surface from the plurality of beams deflected by the light deflector, wherein there are provided a plurality of said fθ lens systems in correspondence with the plurality of beams, and wherein at least one of the plastic lenses of the fθ lens systems is formed in the same cavity of a multiple cavity mold.

Further objects, features and advantages of the present invention will become apparent from the following description of the preferred embodiments with reference to the attached drawings.

DESCRIPTION OF THE PREFERRED EMBODIMENT

Figure 1:
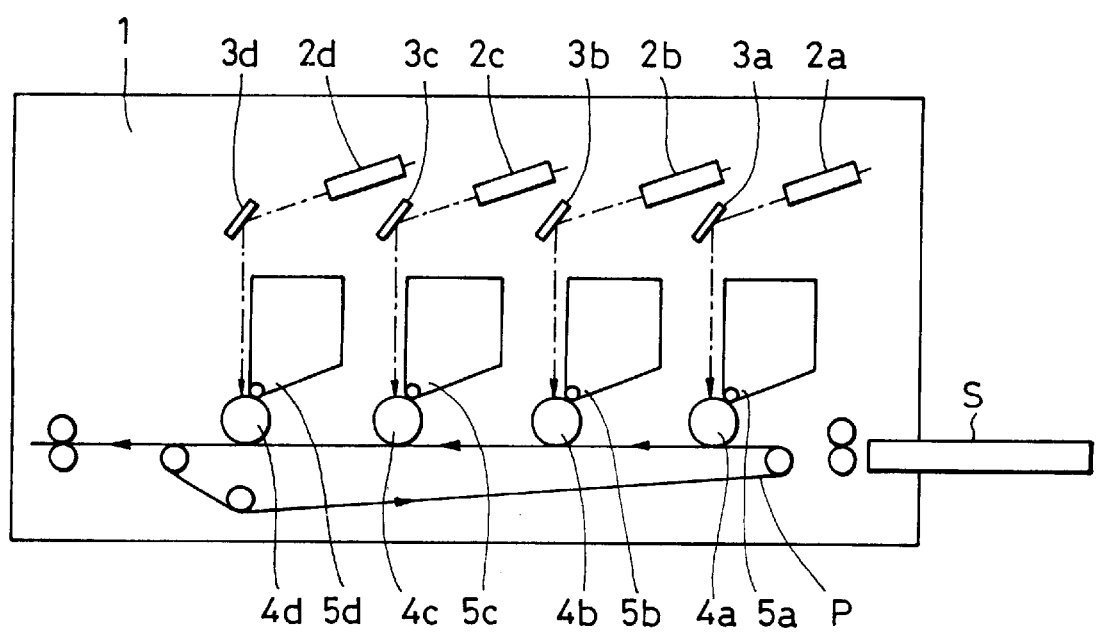
FIG. 1 is a schematic diagram showing a main part of a color image forming apparatus according to a first embodiment of the present invention.

FIG. 1 is a schematic diagram showing a main part of the color image forming apparatus of the first embodiment of the present invention.

In the drawing, numeral 1 indicates the color image forming apparatus (apparatus main body), numerals 2a, 2b, 2c and 2d indicate optical scanning devices (hereinafter also referred to as "scanner units") constructed as described below, and numerals 4a, 4b, 4c and 4d indicate photosensitive drums (photosensitive members) serving as image carriers. In this embodiment, beams (laser beams) optically modulated based on image information are emitted from the optical scanning devices 2a, 2b, 2c and 2d, and directed by way of mirrors 3a, 3b, 3c and 3d to the surfaces of the photosensitive drums 4a, 4b, 4c and 4d serving as recording media to form latent images. These latent images are formed on the photosensitive drums 4a, 4b, 4c and 4d uniformly charged by primary chargers (not shown), visualized as cyan, magenta, yellow and black images by developing devices 5a, 5b, 5c and 5d and sequentially transferred electrostatically by transfer rollers to a transfer material S conveyed by a transfer belt P to thereby form a color image. The mirrors 3a, 3b, 3c and 3d are constructed so as to adjust the inclination of scanning lines by adjusting mechanisms (not shown).

Figure 2:
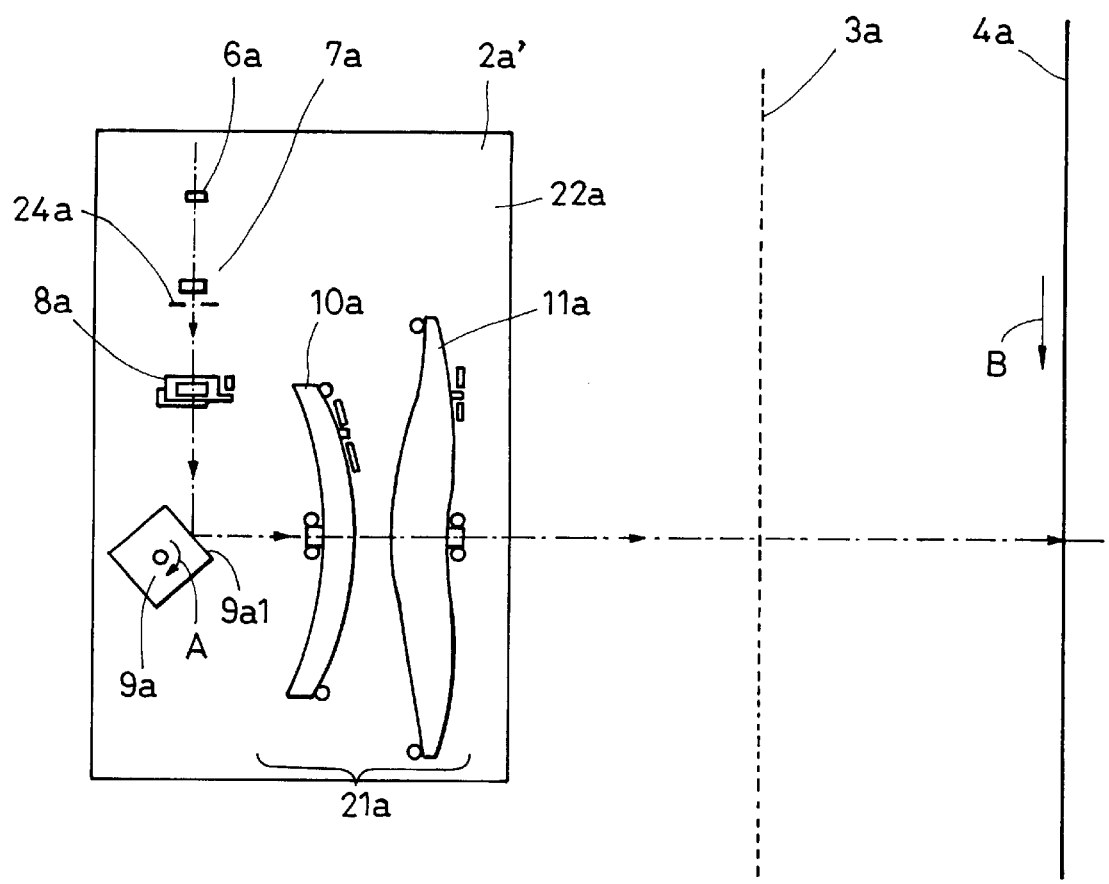
FIG. 2 is a schematic diagram showing a main part of an optical scanning device according to the first embodiment of the present invention.

FIG. 2 is a main part schematic diagram showing one of the optical scanning devices 2a and the image carrier 4a corresponding thereto. In the drawing, the components which are the same as those of FIG. 1 are indicated by the same reference numerals.

In the drawing, numeral 6a indicates a semiconductor laser serving as the light source means. Numeral 7a indicates a collimator lens which transforms the beam emitted from the light source means 6a into a substantially parallel beam. Numeral 24a indicates an opening diaphragm, which restricts the passing beam (quantity of light). The semiconductor laser 6a, the collimator lens 7a and the opening diaphragm 24a are components of the laser unit. Numeral 8a indicates a cylindrical lens formed of a plastic material (plastic cylindrical lens), which has a predetermined refractive power in a sub-scanning direction perpendicular to the plane of the drawing, and forms in the sub-scanning plane a substantially latent image on a deflection surface 9a1 of a light deflector described below from the beam passed through the opening diaphragm 24a. Numeral 21a indicates an fθ lens system (scanning lens system) having an fθ characteristic, which is composed of first and second plastic lenses (plastic fθ lenses) 10a and 11a.

In the optical scanning device of this embodiment, the beam emitted from the semiconductor laser 6a is transformed into a substantially parallel beam by the collimator lens 7a, and the beam (quantity of light) is restricted by the opening diaphragm 24a before the beam impinges upon the plastic cylindrical lens 8a. In the main scanning section, the substantially parallel beam impinging upon the plastic cylindrical lens 8a is output as it is. In the sub-scanning section, it is converged and forms a substantially latent image (which is longitudinal with respect to the main scanning direction) on the deflection surface 9a1 of the light deflector 9a. The beam deflected by the deflection surface 9a1 of the light deflector 9a is passed through the fθ lens system 21a, whereby its scanning linearity is corrected, and is directed to the surface of the photosensitive drum 4a through the mirror 3a. By rotating the light deflector 9a in the direction of the arrow A, optical scanning is performed in the direction of the arrow B on the surface of the photosensitive drum 4a. Then, as described above, latent images of C (cyan), M (magenta), Y (yellow) and B (black) are formed on the surfaces of the corresponding photosensitive drums. After this, they are multi-transferred to the transfer material to form a single color image.

Figure 3:
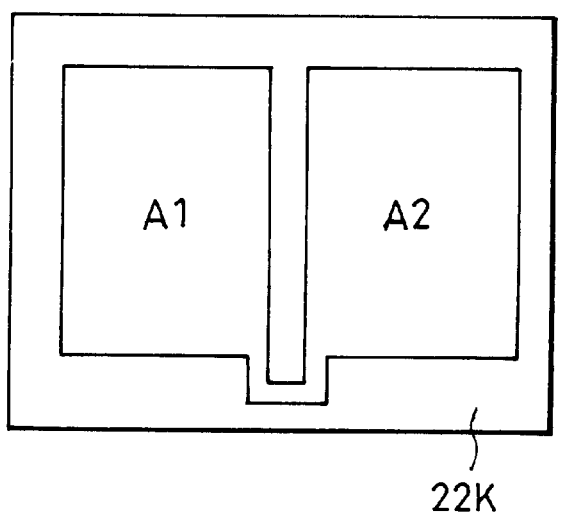
FIG. 3 is a diagram illustrating a multiple cavity mold.
Figure 3:
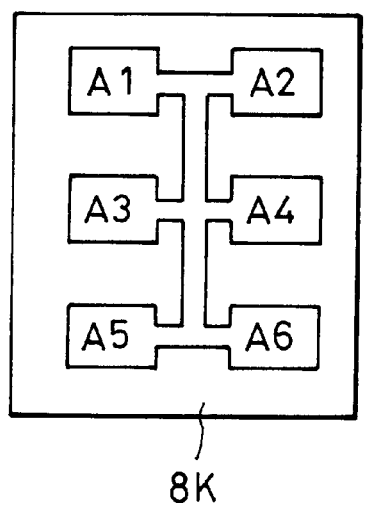
Figure 3:
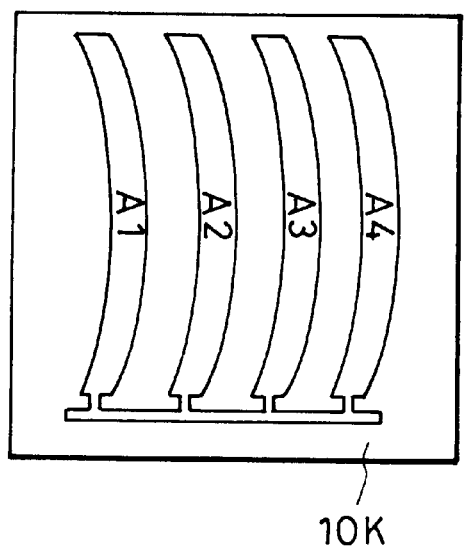
Figure 3:
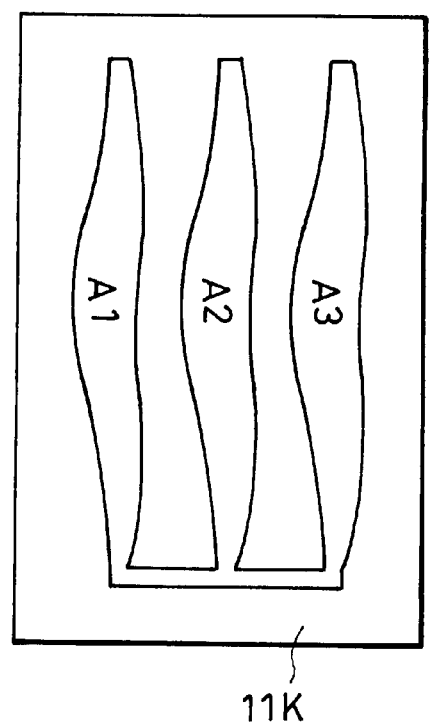

As shown in FIG. 3, in this embodiment, at least one of the plastic lenses forming the optical scanning devices is molded in the same cavity, and at least one of the plastic lenses molded in the same cavity is molded in a multiple cavity mold (22K, 8K, 10K, 11K).

Further, in this embodiment, in each optical scanning device, the laser unit, the cylindrical lens, and the fθ lens system are held by a single plastic holding member, and the plastic holding member is molded in the same cavity, and the plastic holding member molded in the same cavity is molded in a multiple cavity mold. Further, the light deflector of each optical scanning device is held by the plastic holding member.

In this embodiment, the plastic holding member 22a of the scanner unit 2a, the plastic cylindrical lens 8a, and the first and second plastic fθ lenses 10a and 11a are molded in a plurality of cavities, and the cavity combination is specified, the attachment of the plastic lens to the plastic holding member 22a being impossible with any other combination. For example, as shown in FIG. 3, the plastic holding members 22 are molded in two cavities, the cylinders 8 are molded in six cavities, the plastic lenses 10 are molded in four cavities, and the plastic lenses 11 are molded in three cavities.

In this embodiment, the molded products used are molded in two cavities A1 and A2. The number of cavities, which is determined depending upon the molding tact, is not particularly restricted. Naturally, in some cases, only one cavity is used. In FIG. 3, numerals 22K, 8K, 10K, and 11K indicate multiple cavity molds.

As shown, for example, in Table 1, the cavity combinations are specified, no attachment being possible with any other combination.

TABLE 1

|  | Holding member Scanner box 22 | Cylinder 8 | Plastic lens 10 | Plastic lens 11 |
| --- | --- | --- | --- | --- |
| Combination 1 | A1 | A1 | A2 | A1 |
| Combination 2 | A2 | A1 | A1 | A1 |

The above combinations 1 and 2 are determined such that an aberration such as scanning line curvature and field curvature is improved in terms of tolerance. A plurality of scanner units of the same combination are mounted on a single apparatus.

Figure 4:
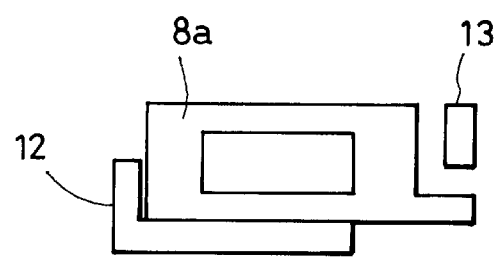
FIG. 4 is a schematic diagram illustrating a plastic cylindrical lens according to the first embodiment of the present invention.
Figure 5:
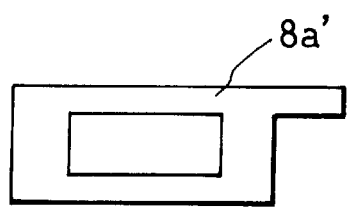
FIG. 5 is a schematic diagram illustrating the plastic cylindrical lens of the first embodiment of the present invention.
Figure 6:
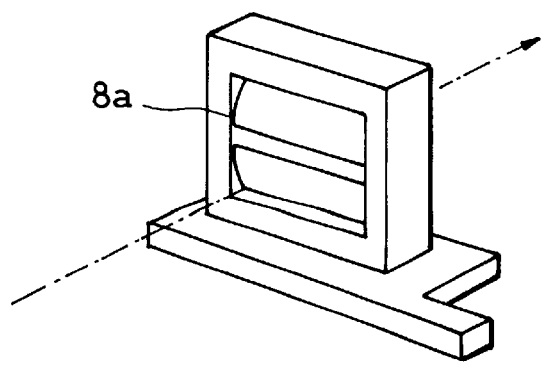
FIG. 6 is a schematic diagram illustrating the plastic cylindrical lens of the first embodiment of the present invention.

FIGS. 4, 5 and 6 are diagrams illustrating the plastic cylindrical lens 8a shown in FIG. 2. In FIG. 4, numeral 12 indicates a positioning member for the positioning on a plastic scanner box 2a', and numeral 13 indicates a cavity determining dowel. The cavity determining dowel 13 differs depending on the cavity of the plastic scanner box 2a' (plastic holding member 22a), and only a plastic cylindrical lens 8a of a specified cavity can be attached. FIG. 5 is a diagram illustrating the plastic cylindrical lens of another cavity; it differs in the configuration of the portion in the vicinity of the cavity determining dowel 13. FIG. 6 is a perspective view of the plastic cylindrical lens 8a.

Figure 7:
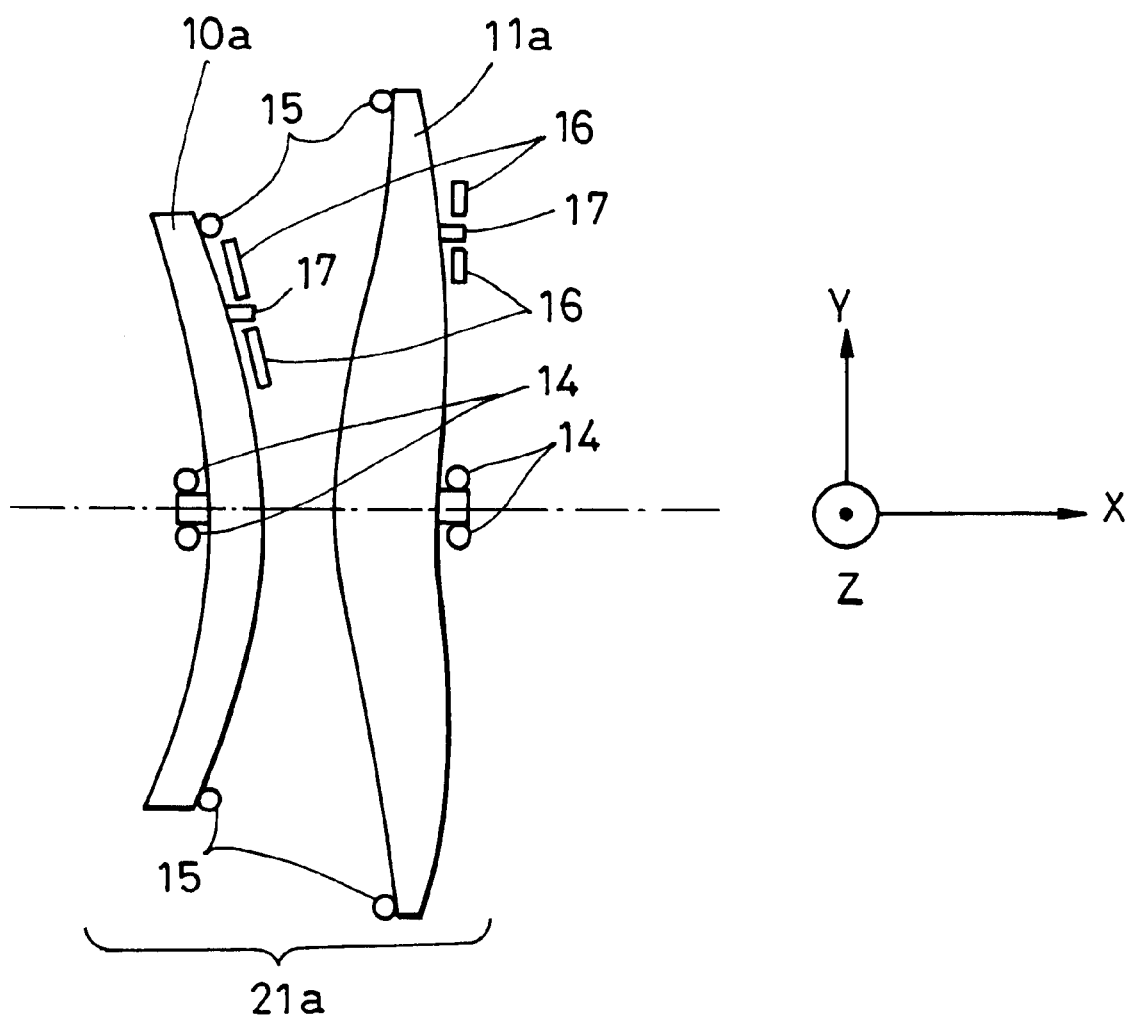
FIG. 7 is a schematic diagram illustrating an fθ lens system according to the first embodiment of the present invention.

FIG. 7 is a diagram illustrating the first and second plastic fθ lenses 10a and 11a constituting the fθ lens system 21a. In the drawing, numeral 14 indicates pins for positioning the first and second plastic fθ lenses 10a and 11a, which are above the plastic scanner box 2a', in the Y-direction, and numeral 15 indicates pins for positioning them in the X-direction. Numeral 16 indicates cavity determining dowels, and numeral 17 indicates pins indicating the cavity of the first and second plastic fθ lenses 10a and 11a. Since the pins 17 indicating the cavities differ in position depending upon the lens cavity, the cavity combination of the plastic scanner box 2a' (plastic holding member 22a) and the first and second plastic fθ lenses 10a and 11a is determined according to the cavity determining dowel 16.

In this embodiment, the color image forming apparatus is constructed as described above, whereby it is possible to prevent positional deviation in scanning of each optical scanning device without having to improve the lens accuracy to an extreme degree.

Figure 8:
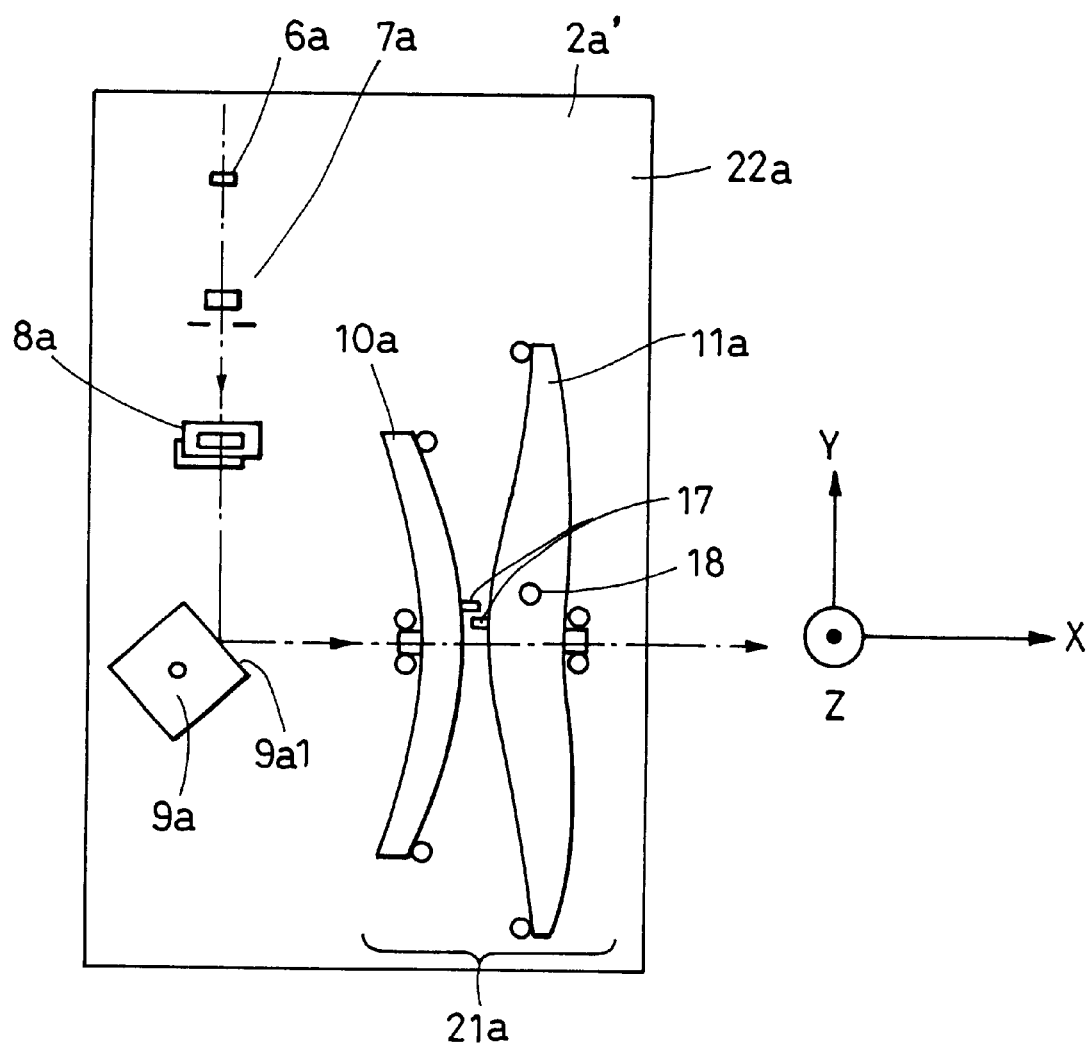
FIG. 8 is a schematic diagram illustrating a main part of an optical scanning device according to a second embodiment of the present invention.

FIG. 8 is a schematic diagram showing a main part of an optical scanning device according a second embodiment of the present invention. In the drawing, the components which are the same as those shown in FIG. 2 are indicated by the same reference numerals.

This embodiment differs from the above-described first embodiment in that only the cavity combination of the first and second plastic fθ lenses is determined, no attachment being possible with any other combination, and that the cavity combination can be recognized from the outward appearance of the plastic scanner box 2a' (optical scanning device 2a). Apart from the above, the construction and the optical effect of this embodiment are substantially the same as those of the first embodiment described above, and the same effect can be thereby achieved.

That is, in the drawing, numeral 17 indicates pins determining the cavity combination of the first and second plastic fθ lenses 10a and 11a, any other cavity combination being impossible. In this embodiment, there are two cavities A1 and A2. Numeral 18 indicates a pin indicating the A1 cavity of the second plastic fθ lens 11a, which passes through the plastic scanner box 2a' in the Z-direction. The A2 cavity is equipped with no pin 17. Therefore, the cavity combination of the first and second plastic fθ lenses 10a and 11a can be recognized according to whether the pin 17 passes through the plastic scanner box 2a' or not.

In this way, in this embodiment, only the cavity combination of the first and second fθ lenses is determined, and the cavity combination can be recognized from the outward appearance of the plastic scanner box 2a', whereby combination error in assembly and replacement is prevented. Further, scanner units of the same combination are mounted in the apparatus main body.

While in this embodiment four lenses of the same combination are incorporated, it is possible to incorporate lenses of any combination as long as the combination of the first and second plastic fθ lenses is determined without involving any problem in performance.

Further, while in this embodiment the cavity combination is recognized according to whether there is a pin or not, this should not construed restrictively. It is also possible, for example, to identify the cavity combination by attaching a label or the like to the plastic scanner box at the time of assembly. It is possible to adopt a construction in which the cavity combination of the plastic lens and the plastic holding member can be recognized from the outside of each scanner unit.

Figure 9:
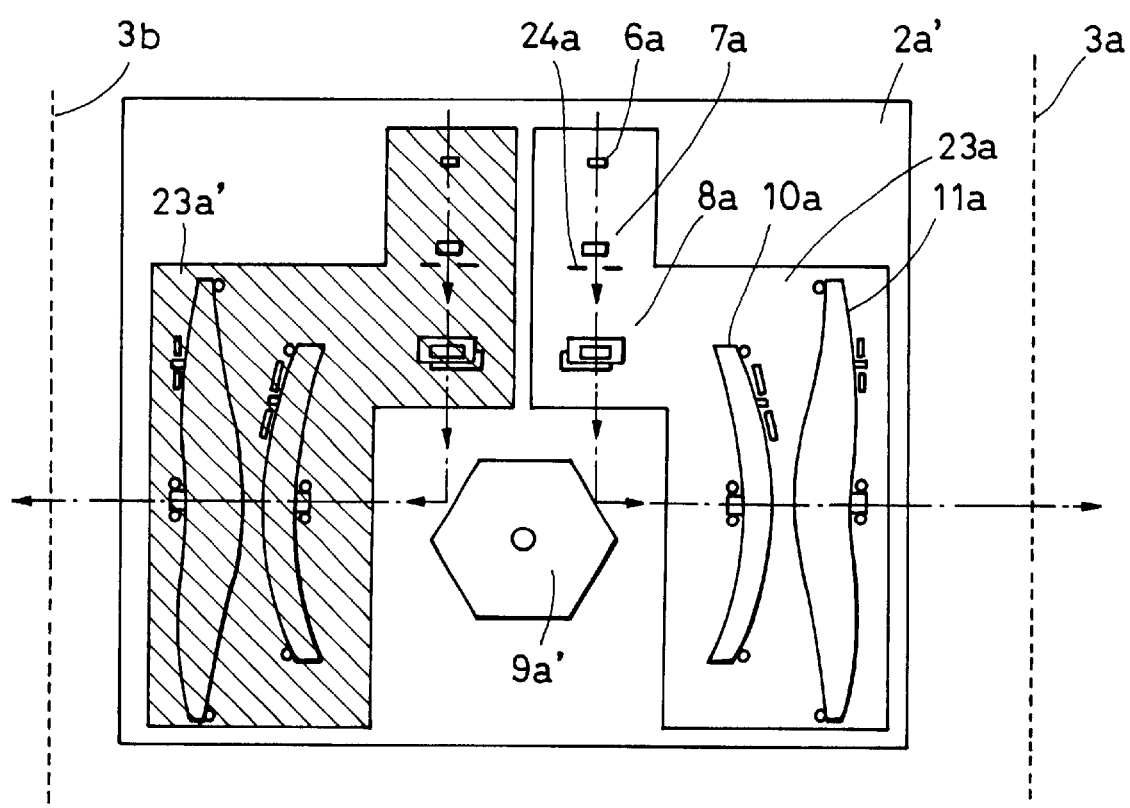
FIG. 9 is a schematic diagram illustrating a main part of an optical scanning device according to a third embodiment of the present invention.

FIG. 9 is a schematic diagram showing a main part of the third embodiment of the present invention. In the drawing, the components which are the same as those shown in FIGS. 1 and 2 are indicated by the same reference numerals.

This embodiment differs from the first embodiment described above in that in each optical scanning device, the laser unit, the plastic cylindrical lens, and the fθ lens system are held by a single plastic holding member and that the light deflector is shared. As in the first embodiment described above, this plastic holding member is molded in the same cavity and in a multiple cavity mold.

That is, in the drawing, numeral 23a indicates a plastic holding member, which holds a semiconductor laser 6a, a collimator lens 7a, a plastic cylindrical lens 8a, and first and second plastic fθ lenses 10a and 11a. As in the first embodiment, the cavity combination of the plastic holding member 23a, the plastic cylindrical lens 8a, and the first and second plastic fθ lenses 10a and 11a is determined.

In this embodiment, a plastic holding member 23a' which is the same as the plastic holding member 23a is arranged symmetrically on the plastic scanner box 2a' with the polygon mirror 9a' therebetween, whereby the polygon mirror 9a' is shared. That is, one plastic holding member 23a' is reversed with respect to the plane of the drawing.

Figure 10:
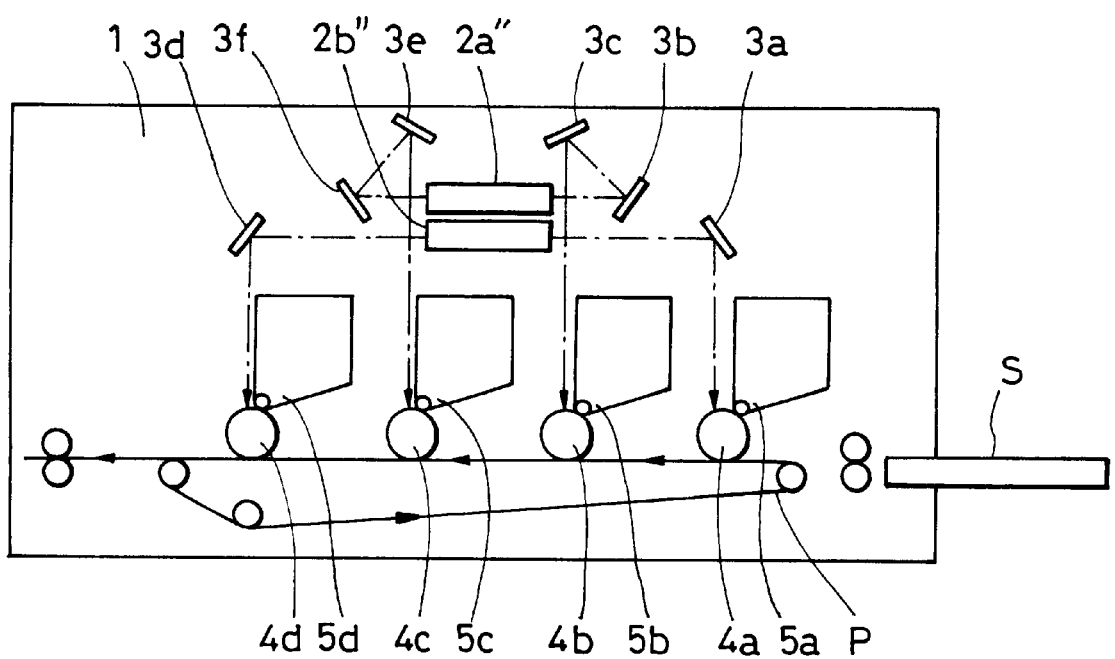
FIG. 10 is a schematic diagram illustrating a main part of a color image forming apparatus according to the third embodiment of the present invention.

FIG. 10 is a schematic diagram showing the construction of the entire apparatus of this embodiment. As shown in the drawing, in this embodiment, two scanner units 2a" and 2b" in which two sets of optical scanning devices are provided are mounted.

By thus constructing the color image forming apparatus, this embodiment provides the same effect as the above-described embodiments.

Figure 11:
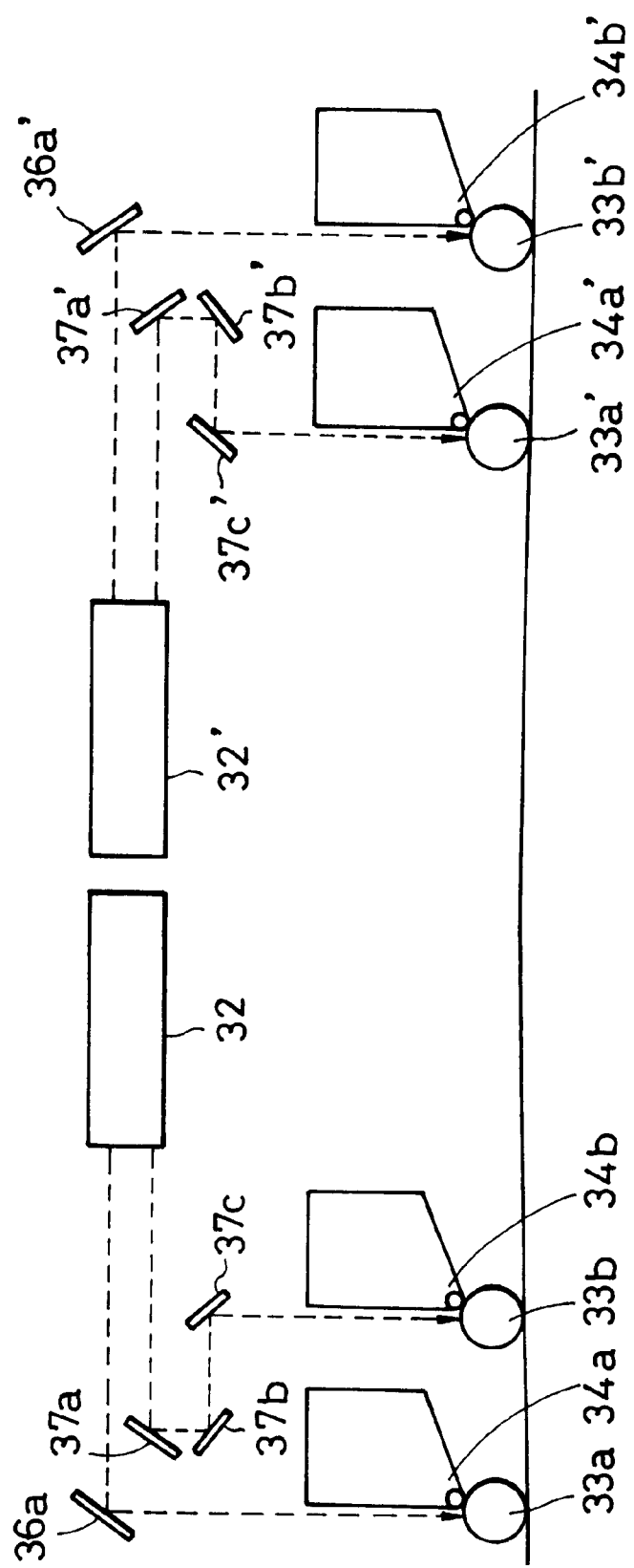
FIG. 11 is a schematic diagram illustrating a main part of a color image forming apparatus according to a fourth embodiment of the present invention using a multi-semiconductor laser.
Figure 12:
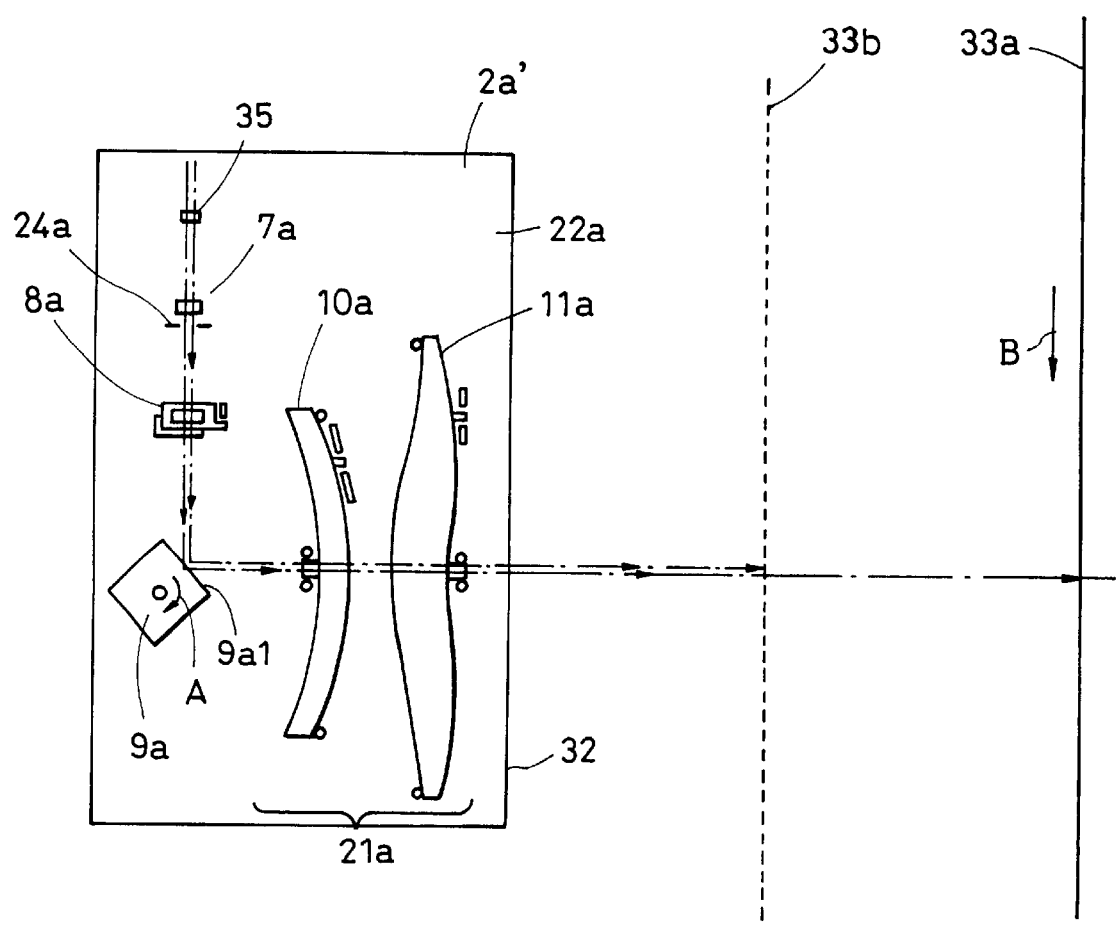
FIG. 12 is a schematic diagram showing a main part of the optical scanning device shown in FIG. 11.

While in each embodiment a semiconductor laser emitting a single beams is used as the light source means, this should not be construed restrictively. For example, it is also possible, as shown in FIGS. 11 and 12, to form the light source means forming the optical scanning devices 32 and 32' by multi-semiconductor lasers. The present invention is also applicable as in the above embodiments when a plurality of beams are emitted from the optical scanning device 32 (while two beams are emitted from each optical scanning device in FIGS. 11 and 12, it is also possible to emit two or more beams) and directed to the surface of the photosensitive drum 33a (33b) to form a color image from the images formed on the plurality of photosensitive drums 33a and 33b.

Figure 13:
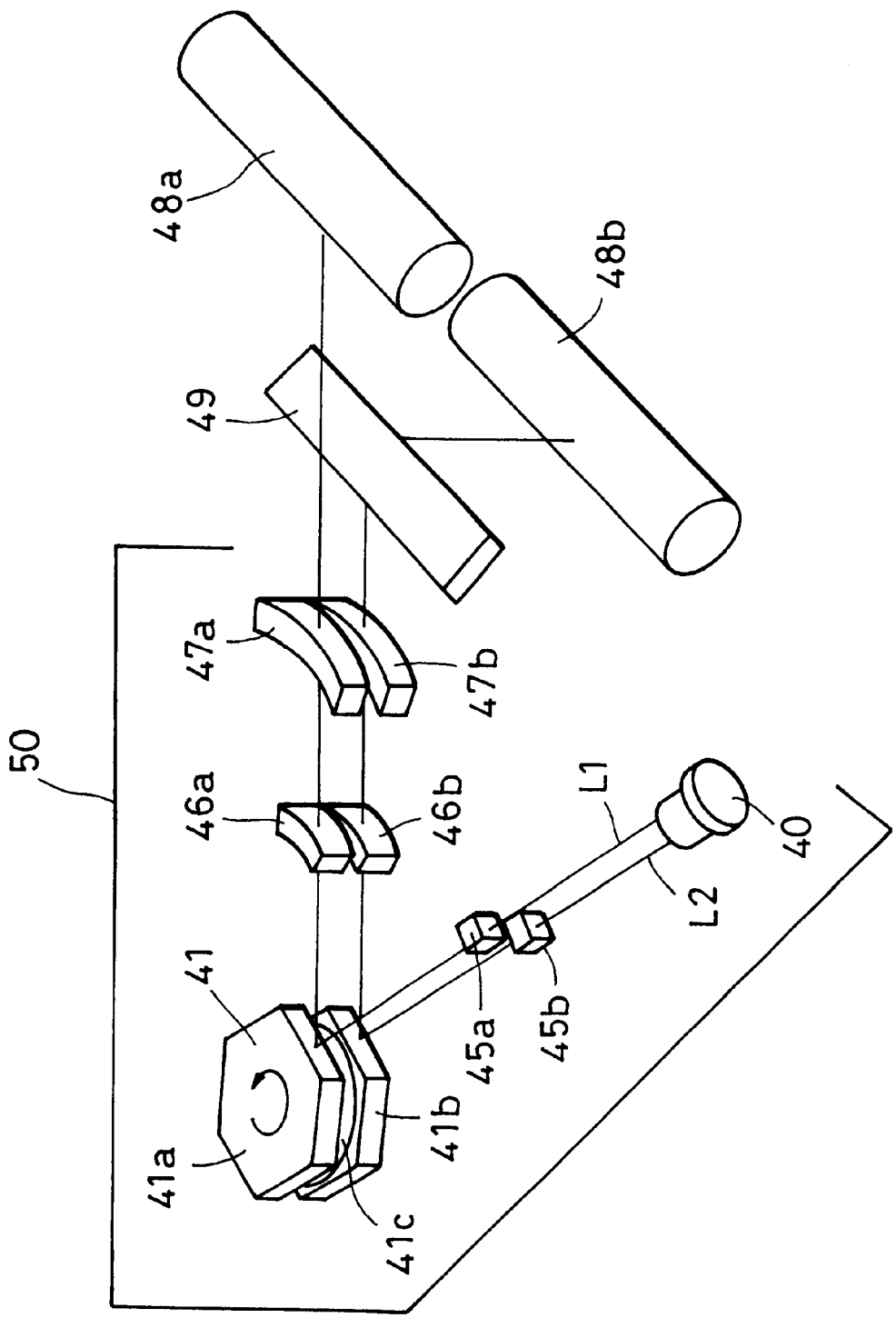
FIG. 13 is a schematic diagram showing a main part of the color image forming apparatus of the fourth embodiment of the present invention.

FIG. 13 is a schematic diagram showing a main part of a color image forming apparatus of the fifth embodiment of the present invention using a multi-semiconductor laser.

A rotary polygon mirror 41 is formed by two polygon mirror portions 41a and 41b and an intermediate section connecting these polygon mirror portions 41a and 41b. These portions are formed by machining a single metal block. A laser light source 40 is provided which emits two beams so that they impinge upon the polygon mirror portions 41a and 41b. Cylindrical lenses 45a and 45b are provided between the laser light source 40 and the polygon mirror portions 41a and 41b. In the emitting direction of the polygon mirror portions 41a and 41b, there are provided upper and lower scanning lenses 46a, 47a, 46b and 47b. Further, in the emitting direction of the upper scanning lenses 46a and 47b, there is provide an image carrier 48a, and, in the emitting direction of the lower scanning lenses 46b and 47b, there is provided a reflection mirror 49, and, in the reflecting direction of the reflection mirror 19, there is provided an image carrier 48b.

Due to this construction, the two laser beams which are emitted from the laser light source 40 and which are parallel beams are caused to focus on the upper polygon mirror portion 41a and the lower polygon mirror portion 41b of the rotary polygon mirror 41 by the cylindrical lenses 43a and 43b having refractive power only in the sub-scanning direction. Further, the beams deflected by the rotary polygon mirror 41 are transmitted through the scanning lenses 46a, 47a, 46b and 47b having an fθ characteristic, and the upper laser beam directed to the image carrier 48a, and the lower laser beam is reflected by the reflection mirror 49 and directed to the image carrier 48b to perform optical scanning.

Here, the laser light source 40 is a laser unit having a multi-semiconductor laser and a collimator lens, and parallel beams L1 and L2 are emitted from the laser light source 40.

Further, the laser light source 40, the rotary polygon mirror 41, the cylindrical lens 45a, the scanning lenses 46a and 47a, the cylindrical lens 45b, and the scanning lenses 46b and 47b are accommodated in a plastic holding member 50.

Here, the first lens system which effects image formation on the image carrier 48a from the first beam L1 emitted from the laser light source 40 is formed by the cylindrical lens 45a and the scanning lenses 46a and 47a, at least one of which is a plastic lens.

Further, the second lens system which effects image formation on the image carrier 48b from the second beam L2 emitted from the laser light source 40 is formed by the cylindrical lens 45b, and the scanning lenses 46b and 47b, at least one of which is a plastic lens.

At least one of the plastic lenses of each lens system is a lens molded in the same cavity of a multiple cavity mold.

As described above, in accordance with the present invention, it is possible to realize a color image forming apparatus of the type which has a plurality of sets of optical scanning devices and image carriers, wherein, by appropriately constructing each optical scanning device, it is possible to prevent positional deviation in scanning of each optical scanning device without having to improve the lens accuracy to an extreme degree.

Further, as described above, in accordance with the present invention, it is possible to realize a color image forming apparatus of the type which has an optical scanning device including a multi-semiconductor laser and a plurality of image carriers, wherein, by appropriately constructing the optical scanning device, it is possible to prevent positional deviation in scanning of the optical scanning device without having to improve the lens accuracy to an extreme degree.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image forming apparatus comprising:
   a laser unit having a semiconductor laser and a collimator lens;
   a light deflector for deflecting a beam emitted from said laser unit;
   a cylindrical lens formed of a plastic lens material adapted to effect image formation on the deflection surface of said light deflector from the beam emitted from said laser unit;
   an fθ lens system having at least one plastic lens effecting image formation on a predetermined surface from the beam deflected by said light deflector;
   a plurality of optical scanning devices each of which includes said laser unit, said light deflector, said cylindrical lens, and said fθ lens system; and
   a plurality of image carriers respectively corresponding to said plurality of optical scanning devices,
   wherein at least one of the plastic lenses of a same optical property of each of said plurality of optical scanning devices is molded in a same cavity of a multiple cavity mold.

2. A color image forming apparatus according to claim 1, wherein in each of said plurality of optical scanning devices, said laser unit, said cylindrical lens, and said fθ lens system are held by a single plastic holding member, the plastic holding member being molded in a same cavity of a multiple cavity mold.

3. A color image forming apparatus according to claim 2, wherein in each of said plurality of optical scanning devices, said light deflector is also held by said plastic holding member.

4. A color image forming apparatus according to claim 2, wherein a cavity combination of said plastic lens and said plastic holding member is specified, and said plastic lens cannot be attached to said holding member in any other combination.

5. A color image forming apparatus according to claim 4, wherein the cavity combination of said plastic lens and said plastic holding member can be recognized from the outside of each optical scanning device.

6. A color image forming apparatus according to claim 4, wherein a plurality of optical scanning devices having the cavity combination of said plastic lens and said plastic holding member are mounted on a main body of the color image forming apparatus.

7. A color image forming apparatus according to claim 1, wherein said fθ lens system has two plastic lenses, and a cavity combination of the two plastic lenses is specified, no attachment being possible with any other combination.

8. A color image forming apparatus according to claim 7, wherein the cavity combination of the two plastic lenses forming said fθ lens system can be recognized from outside of each optical scanning device.

9. A color image forming apparatus according to claim 7, wherein a plurality of optical scanning devices having which the cavity combination of the two plastic lenses forming said fθ lens system are mounted on a main body of the color image forming apparatus.

10. A color image forming apparatus comprising:
    a plurality of optical scanning devices each of which has at least one plastic lens and a plastic holding member holding at least one optical element; and
    a plurality of image carriers respectively corresponding to said plurality of optical scanning devices,
    wherein in said optical scanning devices, at least one of said plastic lenses of a same optical property of each of said plurality of optical scanning devices, and said plastic holding member, are molded in a same cavity of a multiple cavity mold, and the cavity combination of said plastic lens and said plastic holding member is specified, to prevent scanning positional deviation of each of said plurality of optical scanning devices.

11. A color image forming apparatus according to claim 10, wherein the cavity combination of said plastic lens and said plastic holding member can be recognized from outside of each optical scanning device.

12. A color image forming apparatus according to claim 11, wherein a plurality of optical scanning devices having which the cavity combination of said plastic lens and said plastic holding member are mounted on a main body of the color image forming apparatus.

13. A color image forming apparatus according to claim 11, wherein each of said plurality of optical scanning devices has a light deflector, which is held by said plastic holding member.

14. A color image forming apparatus according to claim 10, wherein said plurality of optical scanning devices share a light deflector.

15. A color image forming apparatus comprising:
    a laser unit having a multi semiconductor laser and a collimator lens;
    a light deflector for deflecting a plurality of beams emitted from said laser unit;
    a cylindrical lens for effecting image formation on the deflection surface of said light deflector from the plurality of beams emitted from said laser unit;
    an fθ lens system having at least one plastic lens adapted to effect image formation on a predetermined surface from the plurality of beams deflected by said light deflector;

a plurality of optical scanning devices each of which includes said laser unit, said light deflector, said cylindrical lens and said fθ lens system; and a plurality of image carriers respectively corresponding to said plurality of optical scanning devices, wherein at least one of the plastic lenses of a same optical property of each of said plurality of optical scanning devices is molded in a same cavity of a multiple cavity mold.

16. A color image forming apparatus according to claim 15, wherein in said plurality of optical scanning devices, said laser unit, said cylindrical lens, and said fθ lens system are held by a single plastic holding member, which is molded in the same cavity of a multiple cavity mold.

17. A color image forming apparatus according to claim 16, wherein in said plurality of optical scanning devices, said light deflector is also held by said plastic holding member.

18. A color image forming apparatus according to claim 16, wherein a cavity combination of said plastic lens and said plastic holding member is specified, the plastic lens not being attachable to the plastic holding member with any other combination.

19. A color image forming apparatus according to claim 18, wherein the cavity combination of said plastic lens and said plastic holding member can be recognized from outside of each optical scanning device.

20. A color image forming apparatus according to claim 18, wherein in said plurality of optical scanning devices, the cavity combination of said plastic lens and said plastic holding member is the same.

21. A color image forming apparatus according to claim 15, wherein said fθ lens system has two plastic lenses, and the cavity combination of the two plastic lenses is specified, no attachment being possible with any other combination.

22. A color image forming apparatus according to claim 21, wherein the cavity combination of the two plastic lenses forming said fθ lens system can be recognized from outside of said optical scanning device.

23. A color image forming apparatus according to claim 21, wherein in said plurality of optical scanning devices, the cavity combination of the two plastic lenses forming said fθ lens system is the same.

24. A color image forming apparatus comprising:
a multi semiconductor laser; at least one plastic lens; a plurality of optical scanning devices having a plastic holding member holding at least one optical element; and a plurality of image carriers respectively corresponding to said plurality of optical scanning devices,
wherein in said plurality of optical scanning devices, at least one of said plastic lenses of a same optical property of each of said plurality of optical scanning devices, and said plastic holding member, are molded in a same cavity of a multiple cavity mold, and the cavity combination of said plastic lens and said plastic holding member is specified, to prevent scanning positional deviation of each of said plurality of optical scanning devices.

25. A color image forming apparatus according to claim 24, wherein the cavity combination of said plastic lens and said plastic holding member can be recognized from outside of said optical scanning device.

26. A color image forming apparatus according to claim 25, wherein in said plurality of optical scanning devices, the cavity combination of said plastic lens and said plastic holding member is the same.

27. A color image forming apparatus according to claim 25, wherein said plurality of optical scanning devices have a light deflector, which is held by said plastic holding member.

28. A color image forming apparatus comprising:
a laser unit;
a lens system having at least one plastic lens adapted to effect image formation on a predetermined surface from the beam emitted from said laser unit;
a plurality of optical scanning devices each of which includes said laser unit and said lens system; and
a plurality of image carriers respectively corresponding to said plurality of optical scanning devices,
wherein at least one of the plastic lenses of a same optical property of each of said plurality of optical scanning devices is molded in a same cavity of a multiple cavity mold.

29. A color image forming apparatus according to claim 28, wherein in each of said plurality of optical scanning devices, said laser unit and said lens system are held by a single plastic holding member, which is molded in the same cavity of a multiple cavity mold.

30. A color image forming apparatus according to claim 29, wherein each of said plurality of optical scanning devices further includes a light deflector which is also held by said plastic holding member.

31. A color image forming apparatus according to claim 28, wherein said laser unit has a multi-semiconductor laser emitting a plurality of beams.

32. A color image forming apparatus according to claim 28, wherein said lens system comprises an fθ lens system, and wherein at least one of the plastic lenses of a same optical property of each of said plurality of fθ lens systems is molded in a same cavity of a multiple-cavity mold.

33. A color image forming apparatus according to claim 32, wherein said fθ lens system includes two plastic lenses.

34. A color image forming apparatus according to any of claims 28, 32 and 33, wherein said color image forming apparatus is a laser printer.

35. A color image forming apparatus comprising:
a light source portion;
a light deflector for deflecting a plurality of beams emitted from said light source portion;
a lens system having at least one plastic lens adapted to effect image formation on a predetermined surface from the plurality of beams emitted from said light source portion; and
a plurality of image carriers respectively corresponding to said plurality of beams,
wherein there are provided a plurality of said lens systems so as to be respectively in correspondence with said plurality of beams, and wherein at least one of the plastic lenses of a same optical property of each of said plurality of lens systems is molded in a same cavity of a multiple-cavity mold.

36. A color image forming apparatus according to claim 35, wherein said light source portion has a multi-laser.

37. A color image forming apparatus according to claim 35, wherein each of said lens systems comprises an fθ lens system.

38. A color image forming apparatus according to claim 37, wherein each of said fθ lens systems includes two plastic lenses.

39. A color image forming apparatus according to any one of claims 35, 36 and 37, wherein said color image forming apparatus is a laser printer.

40. A color image forming apparatus comprising:
a laser unit having a multi semiconductor laser and a collimator lens;
a light deflector for deflecting a plurality of beams emitted from said laser unit;

a cylindrical lens formed of a plastic lens material adapted to effect image formation on the deflection surface of said light deflector from the plurality of beams emitted from said laser unit;

an fθ lens system having at least one plastic lens for effecting image formation on a predetermined surface from the plurality of beams deflected by said light deflector;

an optical scanning device including said laser unit, said light deflector, said cylindrical lens and said fθ lens system; and a plurality of image carriers respectively corresponding to the plurality of beams deflected by said light deflector, wherein there are provided a plurality of said fθ lens systems so as to be respectively in correspondence with said plurality of beams, and at least one of the plastic lenses of a same optical property of each of said plurality of fθ lens systems is molded in a same cavity of a multiple cavity mold.

* * * * *

UNITED STATES PATENT AND TRADEMARK OFFICE
CERTIFICATE OF CORRECTION

PATENT NO. : 6,304,282 B1
DATED : October 16, 2001
INVENTOR(S) : Makoto Fujimoto It is certified that error appears in the above-identified patent and that said Letters Patent is hereby corrected as shown below:

Title page,
After item [56], References Cited, insert -- [74] *Attorney, Agent, or Firm* —Fitzpatrick, Cella, Harper & Scinto --.

Column 5,
Line 60, "and an" should read -- an --.

Column 8,
Line 64, "according" should read -- according to --.

Column 9,
Line 36, "construed" should read -- be construed --.

Column 10,
Line 10, "beams" should read -- beam --.
Line 38, "provide" should read -- provided --.

Column 12,
Line 23, "which" should be deleted.
Line 46, "which" should be deleted.

Signed and Sealed this

Twenty-third Day of April, 2002

*Attest:*

JAMES E. ROGAN
*Attesting Officer*  *Director of the United States Patent and Trademark Office*